United States Patent [19]

Renn

[11] 3,922,432

[45] Nov. 25, 1975

[54] MEDIUM FOR SEPARATION PROCESSES

[75] Inventor: Donald W. Renn, Glen Cove, Maine

[73] Assignee: Marine Colloids, Inc., Rockland, Maine

[22] Filed: Feb. 1, 1973

[21] Appl. No.: 328,844

[52] U.S. Cl. .................. 428/327; 156/62; 156/268; 204/180 P; 210/316; 210/500 M; 428/327
[51] Int. Cl. .......................... B32b 9/04; B01k 5/00
[58] Field of Search ...... 161/182, 162; 156/62, 268; 204/180 P

[56] References Cited
UNITED STATES PATENTS

| | | | |
|---|---|---|---|
| 3,276,991 | 10/1966 | Hani et al. ................... | 204/180 P X |
| 3,347,236 | 10/1967 | Torr ............................... | 128/284 |
| 3,356,607 | 12/1967 | Eisenmann et al. .......... | 204/180 P |
| 3,527,712 | 9/1970 | Renn et al. .................... | 106/208 X |
| 3,745,060 | 7/1973 | Jumeniter et al. ............ | 161/158 X |

Primary Examiner—George F. Lesmes
Assistant Examiner—Patricia C. Ives

[57] ABSTRACT

A thin layer medium for use in molecular diffusion or affinity separation processes is made by bonding to the surface of a hydrated gel sheet a layer of discrete particles of water-sorptive material. The medium may be maintained wet until used or it may be dried for storage and rehydrated before use. The particles may contain a substance having an affinity for a component of the composition being subjected to the separation process. In another embodiment, the particles are embedded within the backing sheet, which is scored to expose the surfaces of the particles.

19 Claims, 3 Drawing Figures

MEDIUM FOR SEPARATION PROCESSES

This invention relates to a thin layer medium for use in molecular diffusion or affinity separation processes and more particularly to such a medium having discrete particles of water-sorptive material bonded in or to a hydratable or hydrated gel backing sheet.

Thin layer media have been used in a variety of molecular diffusion separation processes; for most effective and efficient use, particularly when employed for routine analyses, for example, for quality control or clinical analysis purposes, it is important that the media be prepared in advance and that they be of uniform quality and dimensions. This has been accomplished to a limited extent by providing media in the form of a continuous layer or sheet of dry hydratable material which needs only brief immersion in an aqueous medium, e.g., an aqueous buffer solution to cause it to absorb the aqueous medium and swell to form a gel of the desired dimensions and properties. In addition, previously hydrated gel sheets prepared under carefully controlled conditions have been available commercially but require special precautions in packaging and shipping. However, for some purposes it is desirable to have the medium in the form of a bed or layer of small grains or particles to provide a large surface area in a compact mass; it has generally been necessary to form such media immediately before use from a supply of granular material, a procedure which makes it difficult to provide such beds or layers of uniform and reproducible properties. In addition, such beds or layers have the disadvantage that they are capable of containing only a limited amount of absorbed solution such as buffer solution, whereas for certain purposes a large supply of such solution may be required.

The present invention provides a thin layer medium for use in molecular diffusion separation processes such as chromatographic or electrophoretic processes comprising a layer or body of discrete particles of solid, water-sorptive material, the size of the particles being such as to pass a No. 18 screen, U.S. Standard Sieve Series, bonded to or embedded in a backing sheet of hydrated gel or of dried hydratable gel-forming material. The backing sheet when hydrated provides a reservoir of aqueous medium in the backing sheet available for immediate use in the particles bonded to it. The backing sheet may in turn be bonded to a support member. The medium is hydrated before use so that both the particles and backing sheet absorb water, the backing sheet becoming hydrated to a gel. In the case where the particles also contain a hydratable gel material, both the particles and the backing sheet are hydrated to a gel before use. When the particles are embedded in and bonded to the backing sheet as shown in FIG. 3, the particles are composed of a material different from that of the backing sheet. The medium of the present invention is useful in a variety of molecular diffusion or affinity separation procedures including chromatographic and electrophoretic processes, and including radioimmunoassay procedures. While the medium is preferably in the dry form for convenience in shipping and storing, being hydrated simply by immersion in water shortly before use, it can also be maintained in hydrated form for shipping and storing by packaging in moisture-tight containers.

The thin layer medium of the present invention is preferably in the dry form for storing and shipping, being hydrated by immersion in water immediately before use. However, it can be maintained in hydrated condition for storing and shipping provided it is properly packaged.

Figure 1:
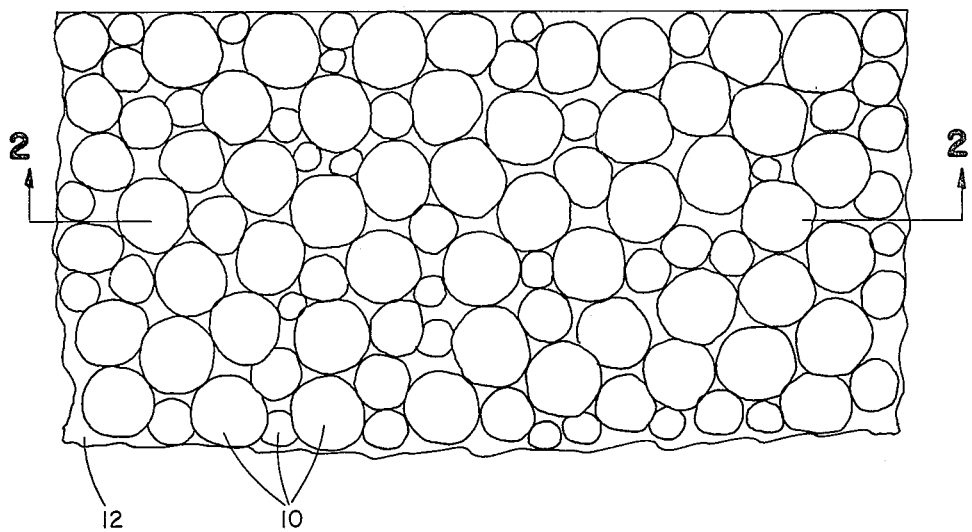
FIG. 1 is a top plan view showing one embodiment of the present invention.
Figure 2:
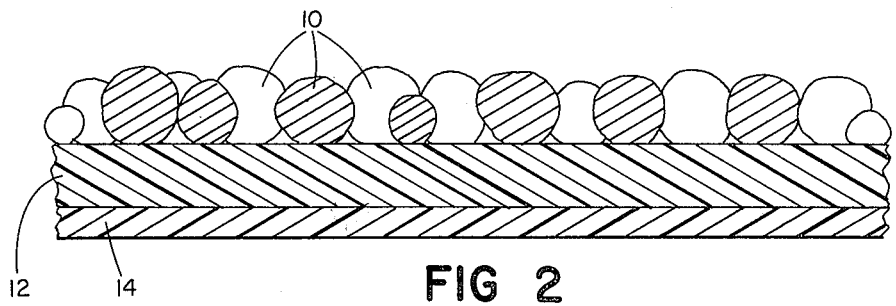
FIG. 2 is a view in cross-section along line 2—2 of FIG. 1.

As shown in FIGS. 1 and 2 of the drawing, the particles 10 of water-sorptive material are bonded to a backing sheet 12, the particles preferably being in contact with each other as well as being bonded to the backing sheet. While it is possible to provide more than a single layer of such particles, the upper layers being bonded to those beneath them, it is preferred to have only a single layer of particles as shown in the drawing. An optional supporting layer 14 of glass or of flexible but stiff material such as polyethylene terephthalate is bonded to and serves as reinforcement and support for backing sheet 12.

Figure 3:
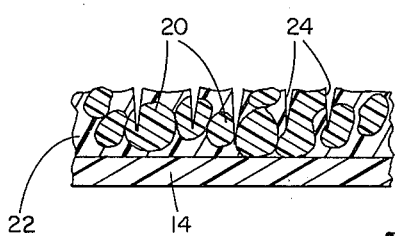
FIG. 3 is a view in cross-section of another embodiment.

In the embodiment shown in FIG. 3 the particles 20 of water-sorptive material are embedded within the backing sheet 22 of hydratable or hydrated gel material, and the sheet is scored or slit at 24 by means of a sharp instrument to expose a portion of the surface of both particles 20 and backing sheet 22. Although the spacing between score lines 24 is not critical, the spacing is preferably and conveniently about 0.05 to 1 millimeter. Generally parallel scorings are preferred, but intersecting scorings transverse to each other as well as two or more intersecting sets of parallel scorings may also be used. In this embodiment also it is preferred but not essential that the particles be in contact with each other, or nearly so. The scoring can be carried out either while the medium is hydrated or after it has been dried. The depth of the scoring is not critical provided the surfaces of the embedded particles are exposed; the scoring may extend all the way through the backing sheet if desired, but it is preferred that it stop short of the bottom so that at least a portion (at least 10% of the thickness) of the sheet remains integral, particularly when cross-scoring is employed. Preferably the depth of the scoring is at least 0.025 mm. Optional backing sheet 14 is shown in this embodiment also.

The particles or grains of the present invention may be composed of any of the water-insoluble and water-sorptive materials useful in molecular diffusion separation processes, many of which are well known and have previously been used in loose particulate beds. The particles may be present either in dry form or they may contain sorbed water as well as other sorbed materials. For example, there may be used particles of carbon black, ion-exchange resin, either cationic or anionic, porous glass, microcrystalline regenerated cellulose, hydroxypropyl cellulose, carboxymethyl cellulose, diethylaminoethyl cellulose, polyacrylamide, and a variety of polysaccharides including starch, dextran, agar, agarose, carrageenan and other water-sorptive gel-forming solid materials. The particles may contain sorbed or dispersed therein, in addition to water, a variety of reagents or substances having a specific affinity for a particular component of the mixture which is to be subjected to a diffusion separation process by means of the particles; for example, the particles may contain antibodies or antigens, enzymes or substrates and other materials absorbed therein and/or bonded thereto. Particles having a specific affinity for (or containing an absorbed or dispersed substance having a specific affinity for) one component of a mixture to be subjected to a separation process may be located in one area or zone of the medium, while one or more additional zones may contain particles having a specific affinity for a different component of the mixture. The individual particles should be large enough to be retained on a No. 400 screen, U.S. Standard Sieve Series.

The backing sheet to which the particles are bonded or in which they are embedded may be composed of any of the hydratable or hydrated gel materials. Many of these materials are well known and have already been proposed for use as media for molecular diffusion separation processes. Among such materials are the various cellulosic materials, polyacrylamide, and polysaccharides mentioned above, of which the polysaccharides, and particularly agarose or mixtures of agarose with up to 70% by weight, based on the weight of the agarose, of an alginate such as sodium alginate together with conventional modifiers or softeners such as sorbitol or other hexitols, polyethylene glycols, etc., are preferred. When the particles are embedded in the backing sheet, particles different in composition from the backing sheet are employed. While the thickness of the backing sheet is not critical, it is desirable that it be at least 0.1 millimeter thick in order to provide an adequate reservoir of aqueous solution for transmission to the particles and it need not exceed 2 millimeters in thickness; indeed, for most purposes it is preferred that the thickness not exceed 1 millimeter.

The backing sheet 12 or 22 is preferably in dry form for storing and shipping, being hydrated by immersion in water immediately before use. However, it can be maintained in hydrated condition for storing and shipping provided it is properly packaged. The scoring operation may be carried out either while backing sheet 12 or 22 is in hydrated gel form or it can be carried out while the layer is in dry form. There may be used for this purpose any sharp edged instrument such as a knife or scalpel, or even a razor blade. Equivalent results are achieved by cutting either by a movement across the surface of the backing sheet in the nature of slicing or by a movement substantially at a right angle to the surface, as in the case of die-cutting; a single cutting instrument can be used, or two or more cutting instruments can be mounted for simultaneous use to provide the desired spacing. The terms "scoring", "scored" and "cross-scored" in this specification and in the claims are intended to be generic terms defining the grooved or cut nature of the surface regardless of the particular procedure by which the surface is formed.

The particles bonded to the surface of the backing sheet can be composed of the same material as the backing sheet, although they need not be identical in composition. The particles may be bonded to the backing sheet by any suitable adhesive material which does not impede the transfer of aqueous medium from the backing sheet to the particles. When the particles are in contact with each other, as is preferred, it is usually preferred to employ the material of the backing sheet itself as the adhesive. For example, the desired particles (which may themselves be either dry or swollen with an aqueous medium) are sprinkled over the surface of a layer or sheet of aqueous solution of gelling material just before it sets to form a backing sheet of gel material, whereupon they become slightly embedded in the surface and permanently bonded to the backing sheet. Such sheets can be dried using known techniques and stored or shipped in dry form and rehydrated shortly before use.

The following specific examples are intended to illustrate the nature of this invention without serving as a limitation upon its scope.

EXAMPLE 1

There was prepared an aqueous solution containing 1% by weight of agarose, 0.5% sodium alginate, 0.25% sorbitol and 0.15% polyethylene glycol (mol. wt. 400). One five milliliter portion of the solution was spread on a polyethylene terephthalate support film 2 ⅝ × 3 ¼ inches in dimensions to form a layer about 1 mm. thick and allowed to stand at room temperature until it began to gel. At that time, there was sprinkled uniformly on the surface of the layer of solution 0.5 gram of granular activated charcoal having a particle size which passed No. 80 screen. After gelation was complete, the product was dried in a forced hot air oven at 40°C. to remove most of the water, in which condition the product was stable during storage, the particles of charcoal being firmly bonded at and closely beneath the surface of the dehydrated gel.

When immersed in distilled water at room termperature, the product readily absorbed water to become rehydrated within about 45 minutes to its gel condition, in which condition it was useful as a medium for chromatographic electrophoretic separation of bound antibodies, hormones, etc. from the corresponding free materials.

There was mixed into a second 5 milliliter portion of the agarose solution described above 0.5 gram of the same charcoal material and the mixture was spread on polyester support film, gelled and dried as described above. It was then scored with a scalpel to a depth sufficient to expose surfaces of the particles as shown in FIG. 3, the scorings being generally parallel and spaced apart about 0.5 mm. Space between scores is not critical and may vary from about 0.1 to about 0.5 mm. While generally parallel scores suffice, cross-scorings can also be used, and there may also be used two intersecting sets of parallel scorings.

Each of the products could be used by placing it in an inclined (about 45°) position and introducing the liquid composition to be separated near the upper end of the surface. It could also be used in horizontal position in a conventional electrophoretic device. The product could be rehydrated and used in the same way as described in the preceding paragraph.

EXAMPLE 2

The procedures of Example 1 were repeated except that there was used in place of the charcoal 0.5 gram of dried agarose beads of a size to pass a No. 80 screen. The beads were prepared by the methods described in U.S. Pat. No. 3,527,712.

The products were readily rehydrated as described in Example 1 and were useful for electrophoretic and chromatographic diffusion separation of mixtures of molecules of different sizes.

EXAMPLE 3

The procedures of Example 1 were repeated using in place of the charcoal 0.5 gram of dried beads of epichlorohydrincross- linked dextran of a size to pass a No. 100 screen (Sephadex G200).

The products were rehydratable and useful in the same way as the products of Example 2.

EXAMPLE 4

The procedures of Example 1 were repeated except that one gram of microporous glass particles was substituted for the charcoal. The particles were of a size to pass a No. 120 screen and contained pores averaging 2500 A in diameter. (Bio Glass 2500).

The products were rehydratable and useful in the same way as the products of Example 2.

EXAMPLE 5

The procedures of Example 1 were repeated using in place of the charcoal 0.5 gram of dried particles of a product made by cross-linking dextran with epichlorohydrin, then reacting with diethylaminoethyl chloride; the particles were of a size to pass a No. 100 screen (DEAE Sephadex).

The products were rehydratable and useful in the same way as the products of Example 2 but possessed the additional characteristic that the particles were cationic in nature and were reactive with molecules containing anionic groups.

EXAMPLE 6

The procedures of Example 1 were repeated except that there was substituted for the charcoal 0.5 gram of dried particles of a product made by cross-linking dextran with epichlorohydrin, then carboxymethylating with chloroacetic acid; the particles were of a size to pass a No. 100 screen (CM Sephadex).

The products were rehydratable and useful in the same way as the products of Example 5 except that the particles were anionic in nature and reactive with molecules containing cationic groups.

EXAMPLE 7

The procedures of Example 1 were repeated except that there was substituted for the charcoal 2.5 g. of wet particles (50% water) of cation-exchange resin (Amberlite IR 120); the particles were of a size to pass a No. 60 screen.

The products were similar to those of Example 6 in properties.

EXAMPLE 8

The procedures of Example 1 were repeated except that there was substituted for the charcoal 1 gram of particles of dried deacetylated chitin, the particles being of a size to pass a No. 100 screen.

The products were similar to those of Example 5 in properties.

EXAMPLE 9

The procedures of Example 1 were repeated except that the charcoal was replaced by 0.5 gram of finely-divided (to pass a No. 100 screen) polyacrylamide (Biogel P-100).

The products were similar to those of Examples 1 to 4 in properties and characteristics.

What is claimed is:

1. A thin layer medium for use in chromatographic or electrophoretic processes or radioimmunoassay procedures, said medium comprising an exposed surface layer of discrete particles of solid material containing sorbed water, said particles being of a size to pass a No. 18 screen U.S. Standard Sieve Series, said particles being bonded to a sheet of hydrated gel material, said sheet being a continuous layer formed by the gelling of an aqueous solution of gelling agent.

2. A medium as claimed in claim 20 in which the sheet consists essentially of a polysaccharide.

3. A medium as claimed in claim 1 in which the particles consist essentially of a member of the group consisting of carbon black, ion-exchange resin, a molecular sieve, or a hydrated gel.

4. A medium as claimed in claim 2 in which the particles consist essentially of a hydrated polysaccharide gel or a hydrated polysaccharide gel in which is dispersed a reagent having a specific affinity for a component of said composition.

5. A medium for use in chromatographic or electrophoretic processes or radioimmunoassay procedures, said medium comprising an exposed surface layer of discrete particles of solid material capable of sorbing water. said particles being of a size to pass a No. 18 screen U.S. Standard Sieve Series, said particles being bonded to a sheet of dried material hydratable to a gel, said sheet being a continuous layer formed by the gelling and drying of an aqueous solution of gelling agent.

6. A medium as claimed in claim 5 which the sheet consists essentially of a polysaccharide.

7. A medium as claimed in claim 5 in which the particles consist essentially of a member of the group consisting of carbon black, ion-exchange resin, a molecular sieve, or a material hydratable to a gel.

8. A medium as claimed in claim 6 in which the particles consist essentially of a polysaccharide hydratable to a gel or a polysaccharide hydratable to a gel in which is dispersed a reagent having a specific affinity for a component of said composition.

9. A medium for use in chromatographic or electrophoretic processes or radioimmunoassay procedures, said medium comprising an exposed surface layer of discrete particles of solid material capable of sorbing water, said particles being of a size to pass a No. 18 screen U.S. Standard Sieve Series, said particles being dispersed in a sheet of dried hydratable material different from said solid material, said hydratable material being hydratable to a gel and said sheet being a continuous layer formed by the gelling and drying of an aqueous solution of gelling agent, said sheet being scored to expose the surface of said particles.

10. A medium as claimed in claim 9 in which the material of the sheet consists essentially of a polysaccharide.

11. A medium as claimed in claim 10 in which the particles consist essentially of a member of the group consisting of carbon black, ion-exchange resin, or a molecular sieve.

12. A medium as claimed in claim 10 in which the particles consist essentially of a material hydratable to a gel in which is dispersed a reagent having a specific affinity for a component of said composition.

13. A medium for use in chromatographic or electrophoretic processes or radioimmunoassay procedures, said medium comprising an exposed surface layer of discrete particles of solid material containing sorbed water, said particles being of a size to pass a No. 18 screen U.S. Standard Sieve Series, said particles being dispersed in a sheet of hydrated gel material, said sheet being a continuous layer formed by the gelling of an aqueous solution of gelling agent, said sheet being scored to expose the surfaces of said particles.

14. A medium as claimed in claim 13 in which the material of said sheet consists essentially of a polysaccharide.

15. A medium as claimed in claim 13 in which the particles consist essentially of carbon black, ion-exchange resin, or a molecular sieve.

16. A medium as claimed in claim 3 in which the particles contain dispersed therein a reagent having a specific affinity for a component of said composition.

17. A medium as claimed in claim 7 in which the particles contain dispersed therein a reagent having a specific affinity for a component of said composition.

18. A medium as claimed in claim 11 in which the particles contain dispersed therein a reagent having a specific affinity for a component of said composition.

19. A medium as claimed in claim 15 in which the particles contain dispersed therein a reagent having a specific affinity for a component of said composition.

* * * * *

UNITED STATES PATENT AND TRADEMARK OFFICE
CERTIFICATE OF CORRECTION

PATENT NO. : 3,922,432

DATED : November 25, 1975

INVENTOR(S) : Donald W. Renn

It is certified that error appears in the above-identified patent and that said Letters Patent are hereby corrected as shown below:

Column 4, line 67, "epichlorohydrincross-linked" should be --epichlorohydrin-cross-linked--;

Column 6, line 4, "claim 20" should be --claim 1--;

Column 6, line 24, after "claim 5", insert --in--.

Signed and Sealed this twenty-fourth Day of February 1976

[SEAL]

Attest:

RUTH C. MASON
Attesting Officer

C. MARSHALL DANN
Commissioner of Patents and Trademarks